United States Patent [19]

Simons

[11] 4,289,560
[45] Sep. 15, 1981

[54] METHOD OF MAKING LAMINATES OF THERMOPLASTIC POLYMERS BY A SINGLE-CHANNEL COEXTRUSION PROCESS AND MELT INJECTOR BLOCK FOR USE THEREIN

[75] Inventor: Phillip R. Simons, Welwyn Garden City, England

[73] Assignee: Imperial Chemical Industries Limited, London, England

[21] Appl. No.: 87,072

[22] Filed: Oct. 22, 1979

[30] Foreign Application Priority Data

Oct. 23, 1978 [GB] United Kingdom ............... 41619/78

[51] Int. Cl.³ .............................................. B29D 9/00
[52] U.S. Cl. ........................ 156/244.18; 156/244.19; 156/244.25; 264/177 R; 425/114; 425/131.1; 425/133.5

[58] Field of Search ...................... 156/244.11, 244.25, 156/243, 244.18, 244.19; 264/171, 177 R; 425/114, 130, 131.1, 133.5, 197, 198, 461, 462

[56] References Cited

U.S. PATENT DOCUMENTS

| | | | |
|---|---|---|---|
| 2,985,556 | 5/1961 | Rowland | 156/244.25 |
| 3,448,183 | 6/1969 | Chisholm | 425/133.5 |
| 3,486,195 | 12/1969 | Greenwood et al. | 425/131.1 |
| 3,833,704 | 9/1974 | Nissel | 264/177 R |
| 4,094,947 | 6/1978 | Alfrey et al. | 425/133.5 |
| 4,187,270 | 2/1980 | Bartrum | 264/177 R |

Primary Examiner—Caleb Weston
Attorney, Agent, or Firm—Cushman, Darby & Cushman

[57] ABSTRACT

The melt injector block contains guides for defining the width of secondary streams. This gives edge trim of base polymer only. Recycle is easier and stenter clips do not get stuck in heat-seal layers.

7 Claims, 9 Drawing Figures

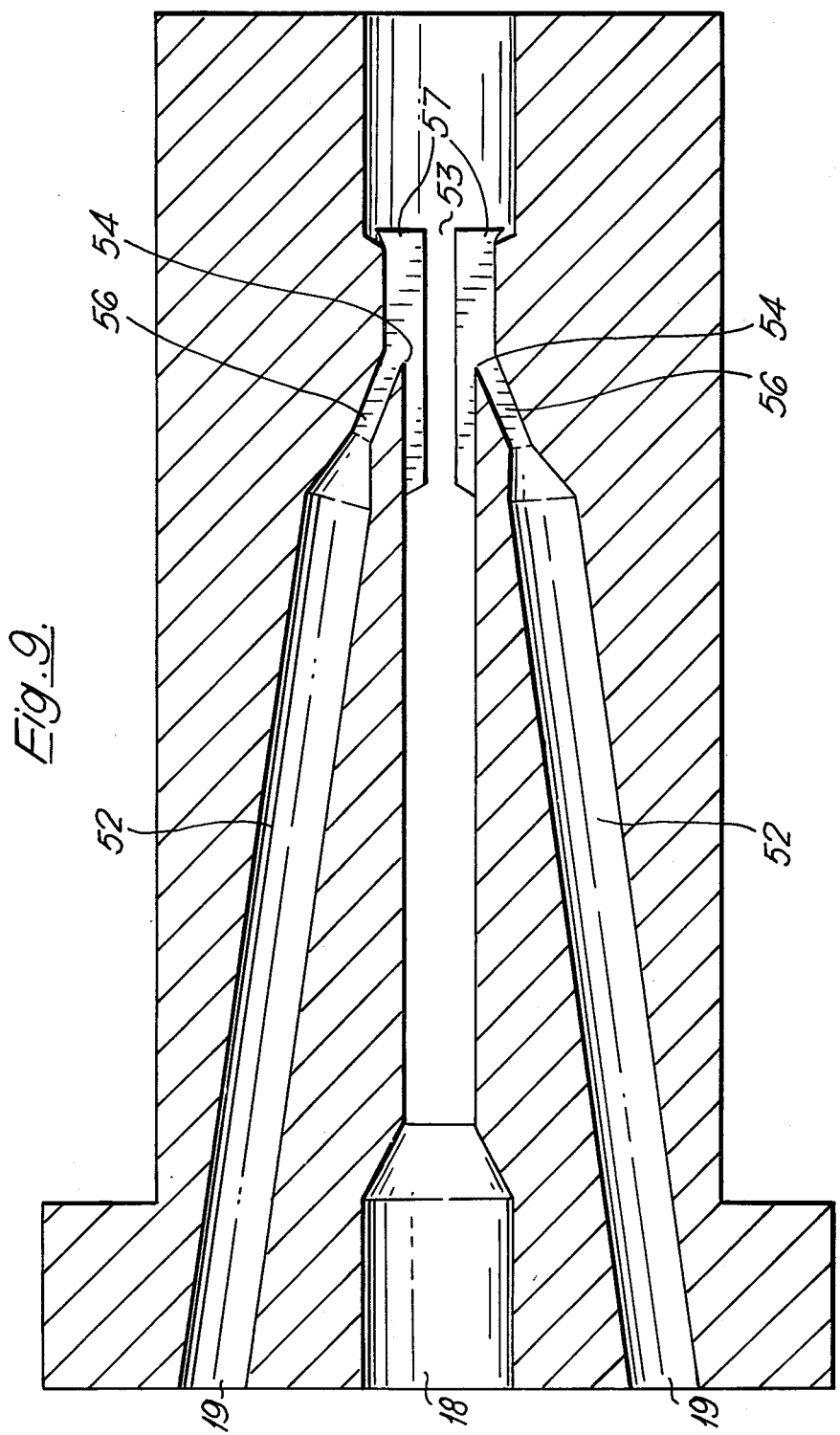

METHOD OF MAKING LAMINATES OF THERMOPLASTIC POLYMERS BY A SINGLE-CHANNEL COEXTRUSION PROCESS AND MELT INJECTOR BLOCK FOR USE THEREIN

This invention relates to the preparation of laminates of thermoplastic polymers by a flat film process and more particularly to the preparation of such laminates by a single channel coextrusion process.

The single channel coextrusion process is based on the fact that the extrusion of films is usually carried out under conditions of lamina flow. Under these conditions no mixing occurs across the cross section of the stream and therefore the different components comprised in a composite stream will give rise to distinct regions in the final laminate.

In many film-making processes the edges of the film are of low quality. For example, films of poly(ethylene terephthalate) are usually drawn both in the machine direction (i.e. in the direction of extrusion) and in the transverse direction (i.e. at right angles to the direction of extrusion). The transverse draw is carried out by means of a stenter which grips the edges of the film in clips in order to apply sideways forces. The clips damage the edges of the film and the damaged edges are cut off giving rise to a waste material conveniently known as "edge trim". The edge trim is usually a strip about 10 cm wide.

Since edge trim is a valuable polymer it has to be recovered, e.g. by cutting it into small pieces which are returned to the extruder. Where the edge trim contains two different polymers, recovery is difficult because in any other composition one polymer will be an impurity. U.S. Pat. No. 3,448,183 proposes that a multi-channel coextrusion process should be carried out in such a manner that the edge trim consists of one polymer only. When applied to a single channel coextrusion process this requires good control so as to produce sufficiently defined boundaries for the edge trim. It is an object of this invention to facilitate the production of such boundaries.

According to the invention a melt injector block for use in a single channel coextrusion process comprises a primary channel for a primary stream of molten thermoplastic polymer and one or more secondary channels for one or more secondary streams of molten polymer characterised in that at a confluence where a secondary channel enters the primary channel the melt injector block contains guides for defining the width of a secondary component of a composite stream.

According to a preferred embodiment of the invention a melt injector block comprises:
(a) one primary channel for a primary lamina-flow stream of molten thermoplastic polymer,
(b) one secondary channel for a secondary lamina-flow stream of molten thermoplastic polymer
(c) a unified channel for a composite stream, and
(d) a confluence where the secondary channel enters the primary channel.

characterised in that the melt injector block also includes a single pair of guides positioned wholly or partly in the primary channel beginning at the confluence or, preferably, continuing past the confluence into the unified channel, the secondary channel entering the unified channel between the guides. Preferably the guides are parallel to one another and they are spaced apart by a distance equal to the width of the secondary channel at the confluence.

According to another preferred embodiment of the invention a melt injector block comprises:
(a) one primary channel for a primary lamina-flow stream of molten thermoplastic polymer,
(b) two secondary channels for secondary lamina-flow streams of molten thermoplastic polymer,
(c) a unified channel for a composite stream, and
(d) two confluences each confluence being where a secondary channel enters the primary channel, characterised in that the melt injector block also includes two pairs of guides, each pair being positioned partly in the primary channel and continuing past one of the confluences into the unified channel, each secondary channel entering the unified channel at a confluence situated between one pair of guides. Preferably all four guides are parallel to one another and each pair is spaced apart by a distance equal to width of the secondary channel at the confluence between that pair of guides.

The invention also includes a method of making a laminate of thermoplastics materials comprising the steps of:
(a) joining in a tube one primary lamina-flow stream of molten thermoplastic resin and at least one secondary lamina-flow stream of molten thermoplastic resin to obtain a composite lamina-flow stream of molten thermoplastic resin which has a sharply defined principle juncture or sharply defined principle junctures between the components of the composite stream,
(b) Passing said composite stream into the manifold of a sheeting extrusion die, the principle juncture plane(s) being parallel to the principle direction of flow of the resin as it passes from the manifold and takes on the shape of sheeting, and
(c) extruding the composite stream under conditions of lamina-flow whereby a laminate is produced; characterised in that at the place where the or each secondary stream joins the primary stream the secondary stream(s) are confined between guides which guides define the width of the secondary stream(s).

The method can be used to make laminates from a wide variety of polymers. For example it can be used to make heat-sealable polyester laminates in which the primary layer is homopolymer polyethylene terephthalate and the heat-seal layer is a copolyester of ethylene glycol with 95 to 70% of terephthalic acid and 5 to 30 mole % of isophthalic acid.

A preferred embodiment of the invention will now be described by way of Example with reference to the accompanying drawings in which.

Figure 5:
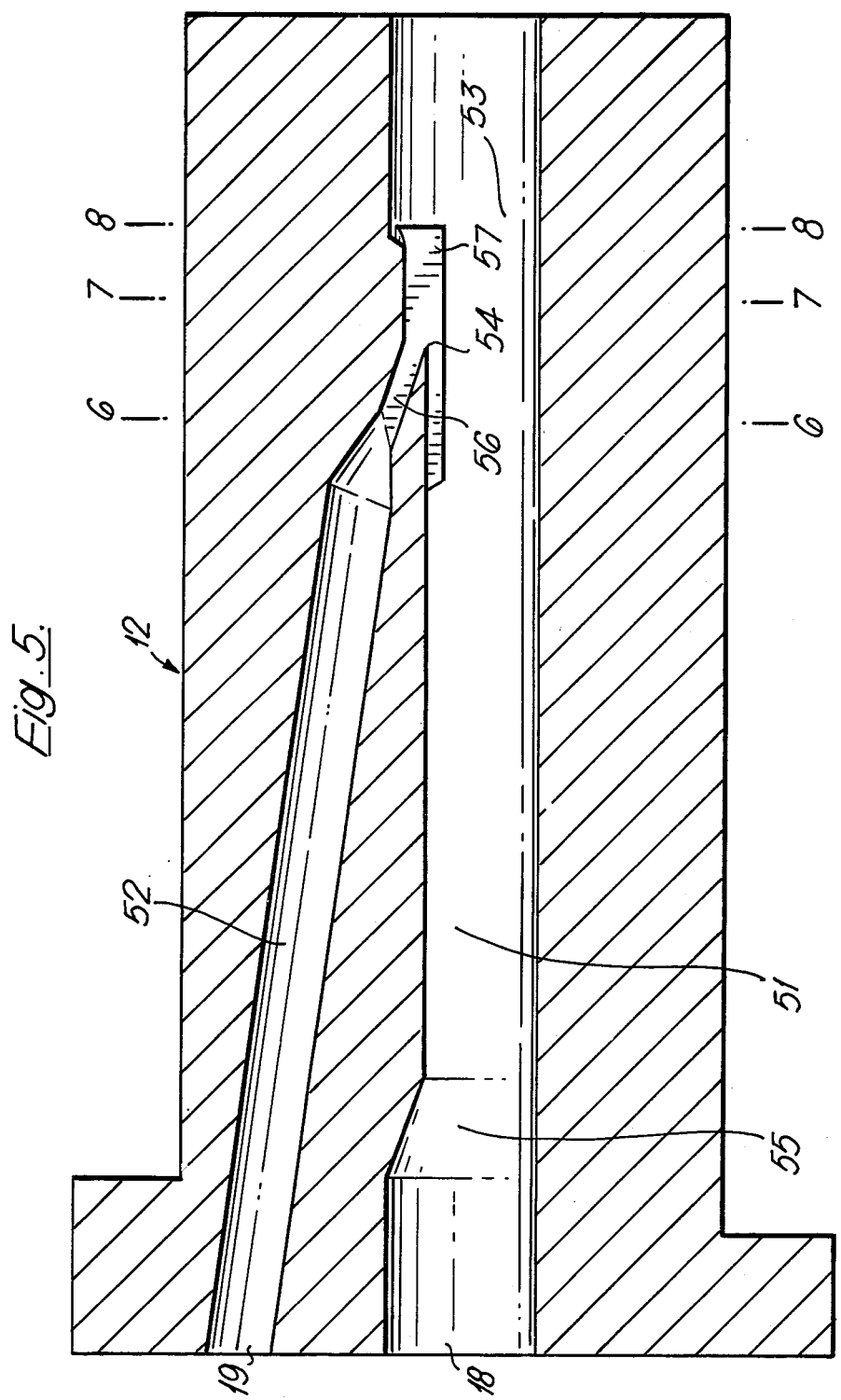
FIG. 5 is a longitudinal cross section on the plane of symmetry of an injector block for melts of approximately equal viscosity according to the invention.

FIG. 9, corresponds to FIG. 5, but shows a block with two secondary channels.

Figure 1:
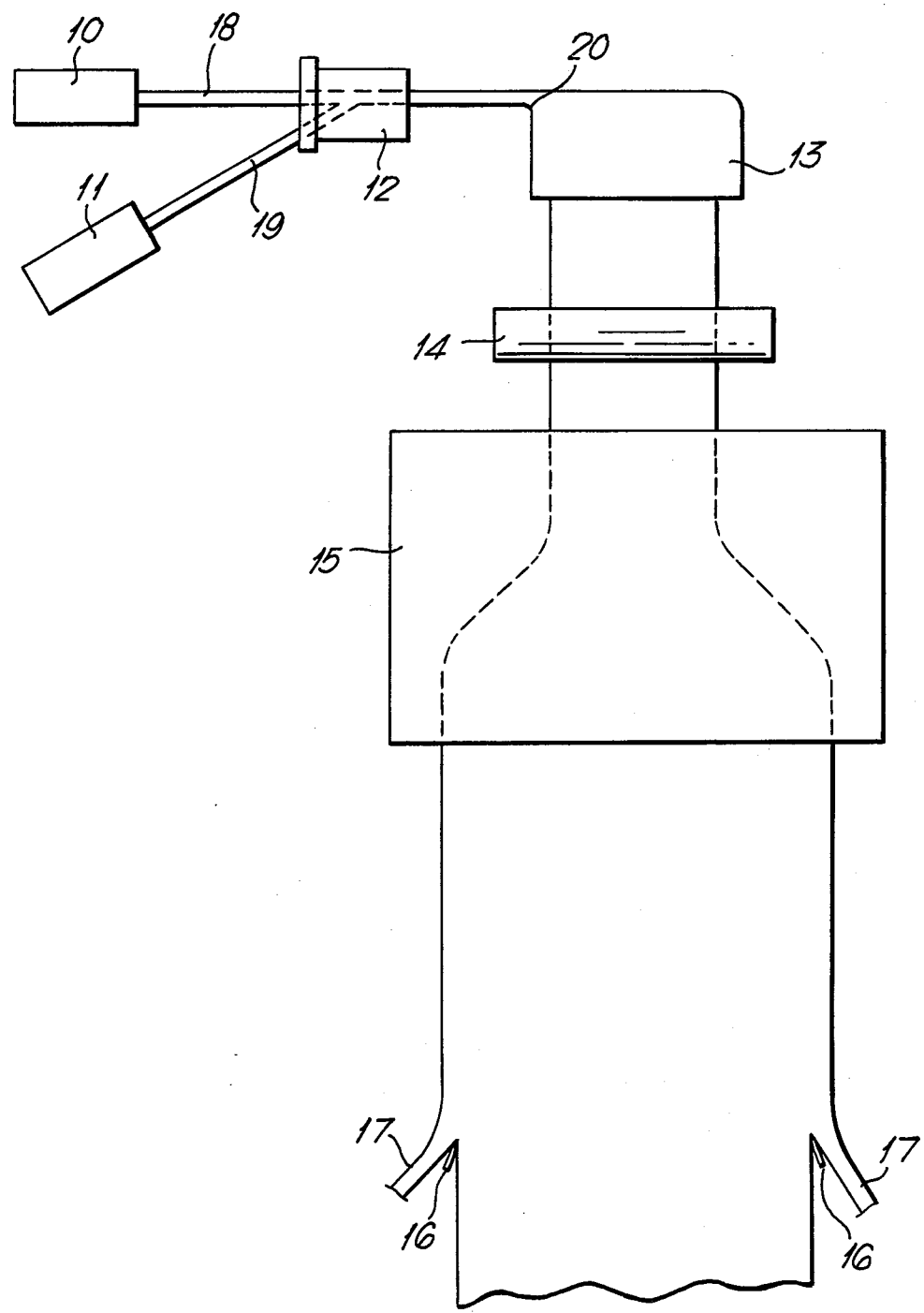
FIG. 1 illustrates a single channel coextrusion process with edge trim.

The coextrusion line illustrated in FIG. 1 comprises a primary extruder 10 and secondary extruder 11. The primary extruder 10 provides a primary lamina flow stream of molten thermoplastic resin to the primary inlet 18 of a melt injector 12. The secondary extruder 11 provides a secondary lamina-flow stream of molten thermoplastic resin to the secondary inlet 19 of the melt injector 12. FIG. 1 illustrates the location of the melt injector 12. Its construction, which is an important feature of this invention, is illustrated in FIGS. 5 to 9.

The melt injector forms a composite lamina-flow stream which has a sharply defined juncture between its primary and secondary components.

The composite stream is converted to a laminate by a process conventional for homogeneous streams. Thus it passes to the manifold 20 of an end-fed sheet extrusion die 13. As the composite stream passes through the die 13 its shape is changed from circular cross section to the shape of the sheet. Lamina flow is maintained throughout which means that each region of the composite stream keeps its identity throughout the extrusion and therefore in the final product. Thus a laminate is produced. After extrusion conventional treatment for a homogeneous film of polyethylene terephthalate continues; i.e. it is subjected to forward draw in the nip rollers 14 and to sideways draw in the stenter 15.

The stenter damages the edges of the laminate and the damaged edges are cut off by knives 16 and removed as edge trim 17. The edge trim is valuable polymer and it is, therefore, desirable (if not necessary) to recover the edge trim. (In most commercial processes the edge trim is cut into small pieces and returned to the hopper of an extruder, e.g. the extruder 10 of FIG. 1.) U.S. Pat. No. 3,448,187 (describing twin channel coextrusion) points out that recovery is easier if the edge trim contains only one polymer. We have also observed that in certain laminates, e.g. heat-sealable laminates, one or both outer layers may interfere with the operation of the stenter. Thus it is advantageous to carry out the single channel coextrusion so that the edge regions consist of one polymer only and preferred configuration for the laminate before the removal of edge trim are illustrated in FIGS. 2, 3 and 4.

Figure 2:
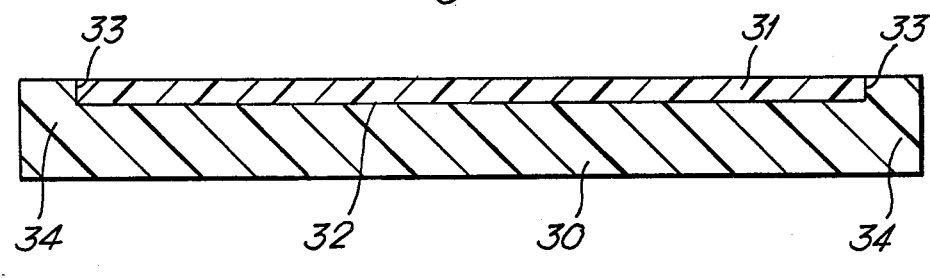
FIG. 2 is a transverse cross section of a two-layer laminate (before edge trim) produced in accordance with the invention.

FIG. 2 shows in cross section a two-layered laminate having a primary layer 30 and a secondary layer 31. The two layers meet in a primary boundary 32 which is parallel to the plane of the laminate and in side-boundaries 33 each about 10 cm in from the edges of the sheet. The edge regions 34, i.e. outside the side boundaries 33, consist entirely of the polymer of the primary layer 30.

Figure 3:
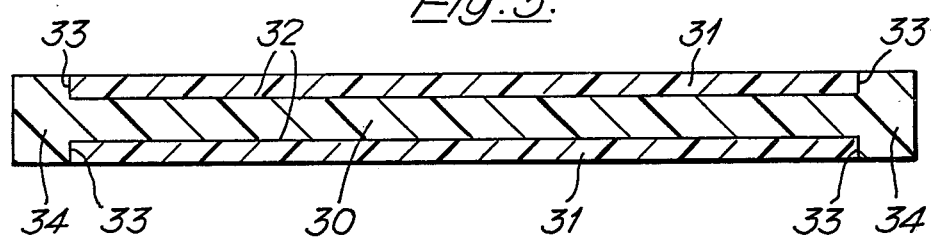
FIG. 3 is a transverse section of a three-layer laminate (before edge trim) produced in accordance with the invention.

FIG. 3 is similar to FIG. 2 but showing a three-layered laminate. The numerals have the same significance in both FIGS. 2 and 3. The two secondary layers may have the same or different composition.

Figure 4:
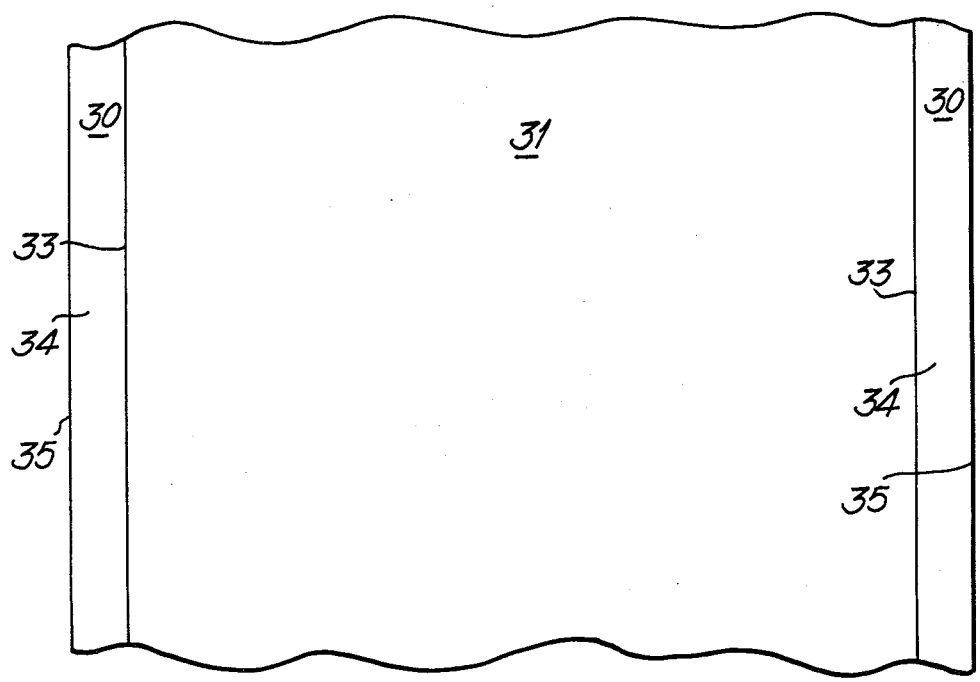
FIG. 4 is a plan view of the laminates of FIGS. 2 and 3.

FIG. 4 shows a plan of the laminates showing that the side-boundaries 33 continue substantially parallel to the edges 35 of the laminate. There is slight variation of the position of the side boundaries 33 (about 1 cm either side of the mean position) but this is so small that the stenter only contacts the homogeneous edge regions 34. However, it is necessary to cut the edge trim inside the side-boundaries 33. This means that the edge trim consists mostly of primary polymer contaminated with a small amount of secondary polymer. The slight contamination makes it easier to recover the edge trim. (If it is important to avoid even slight contamination it is better to make a double edge trim. The first edge trim is made outside the side-boundaries 33. The first edge trim consists of one polymer only so that recovery is possible but the laminate still has imperfect edges. The second edge trim is made inside the side-boundaries 33 to give satisfactory edges and a narrow strip of material which cannot be recovered.)

It is a particular advantage of the single channel coextrusion process that it is easy to adjust the relative thickness of layers of the laminate. All that is needed is adjustment of the relative rates of primary and secondary extruders. In conventional single channel processes this adjustment affects the position of the boundaries 33. The injector block according to the invention enables relatively large adjustments to the flow rates without substantial effects on the position of the side boundaries.

FIGS. 5 to 8 illustrate the injector block shown as 12 in FIG. 1. The injector block is designed for melts of approximately equal viscosity. FIG. 5 shows half the block; the other half is a mirror image of FIG. 5. As stated the block has a primary inlet 18 and a secondary inlet 19. It includes a primary channel 51 and secondary channel 52 which become a unified channel 53 at the confluence 54. Initially both channels have a circular cross section the cross sections change so as to conform to the cross section at the confluence 54. Thus the primary channel 51 converges at 55 so that it has a flat top (the shape can be seen in FIG. 6). The secondary channel 52 converts from a circular cross section at its inlet 19 to a rectangular cross section at 56. The block also includes two guides 57 (only one appears in FIG. 5). These commence in the primary channel 51 and continue past the confluence 54 into the unified channel 53. It is emphasized that the inventive block differs from a conventional block by the presence of the guides 57 (and it is these guides which produce the configuration of the composite stream which is characteristic of the process of the invention). The configuration of the block in this region is further illustrated by the transverse cross sections of FIGS. 6, 7 and 8.

Figure 6:
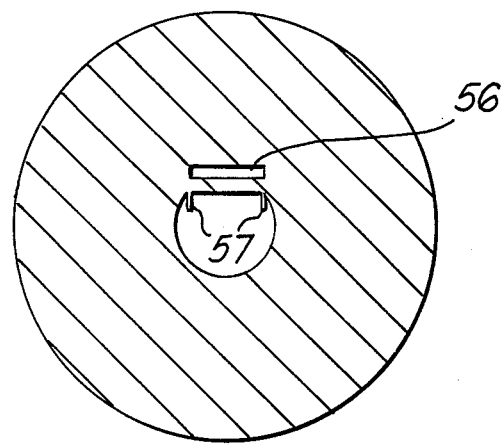
FIGS. 6 to 8 are a tranverse cross section of the injector block shown in FIG. 5, the cross section being on the planes 6—6, 7—7 and 8—8 as indicated in FIG. 5.
Figure 7:
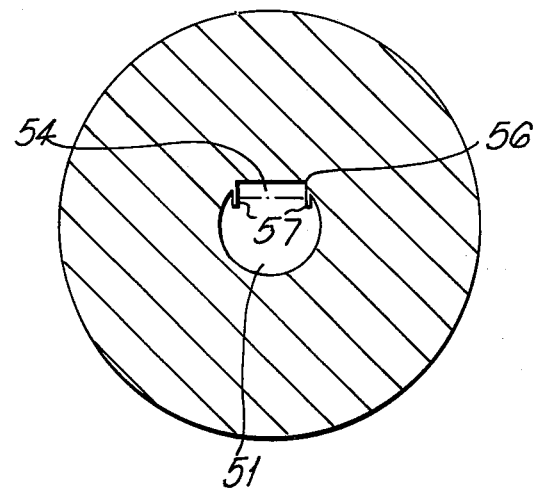
Figure 8:
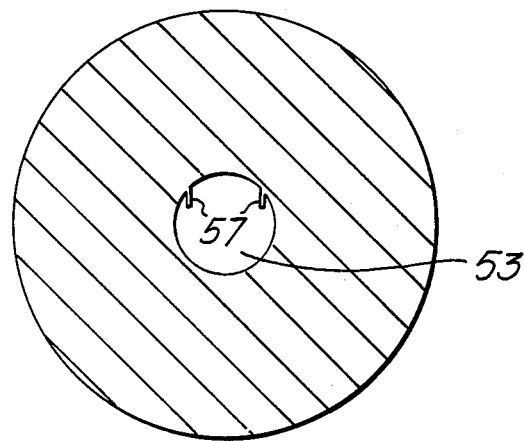

FIG. 6 shows the configuration before the confluence. The secondary channel has the rectangular cross section 56 which has the same major dimension as the distance between the guides 57. The configuration after (and at) the confluence is illustrated in FIG. 7. Although the primary and secondary channels have unified, their cross sections can still be recognized. FIG. 8 shows that the unified channel 53 finally achieves a circular cross section and the guides 57 continue into this region.

During operation (i.e. the method of the invention) the primary extruder supplies a primary stream of molten thermoplastic resin to the channel 18 and the secondary extruder supplies a secondary stream of thermoplastic resin to the channel 52. Each extruder operates in conventional manner (i.e. to give lamina-flow in the die and the pipes leading to it) and the relative speeds of the extruders (i.e. volume supply rates) are adjusted to the relative amounts of the thermoplastics in the extrudate.

The two lamina-flow streams meet at the confluence 54 but the secondary stream is contained between the guides 57. This means that the width of the secondary stream is determined by the distance between the guides. Since the volume flow rates of the streams are fixed by the proportions in the laminate and the cross sections are imposed by the block the linear velocities will not match except fortuitously. After confluence the linear velocities will adjust and match. This adjustment will cause the secondary stream to get thinner (if adjustment causes its average speed to increase) or thicker (if its average speed decreases). However, the width does not alter because this is determined by the width between the guides. Thus the guides define satisfactory edge trim for a wide range of relative supply rates. (There will be practical limits to the range. There must be enough secondary thermoplastic to form a continuous stream. There must not be so much of the secondary stream that it overflows from between the guides 57.)

It is emphasized that upstream of the block the process is the operation of extruders conventional in single channel coextrusion. Downstream of the block the process is the conventional production of an homogeneous film.

It is possible to produce more complicated laminates by feeding a composite stream to the channel 52.

Three-layer laminates (as shown in FIG. 3) can be produced using an injector block which duplicates the channel 52. Such a block is shown in FIG. 9. The numerals are the same as in FIG. 5. Since the channels are the same as in FIG. 5 they will not be further described.

The injector block described above was incorporated into conventional apparatus for the coextrusion of polyesters and used to make a conventional heat-sealable polyester laminate. The final laminate was 20 um thick of which the base layer was 16 um of homopolymer polyester and the heat-seal layer was 4 um of copolyester. The copolyester was derived from ethylene glycol and a mixture of acids consisting of 20 mole % isophthalic acid and 80 mole % terephthalic acid. The two polymers were extruded into a laminate with edges, 10 cm wide, consisting only of homopolymer. The guides accurately located into boundaries thus facilitating the edge trim.

I claim:

1. A melt injector block for use in a single channel coextrusion process which comprises a primary channel for a primary stream of molten thermoplastic polymer, one or more secondary channels for one or more secondary streams of molten thermoplastic polymer, and a unified channel for a composite stream, characterised in that at the or each confluence where a secondary channel enters the primary channel the melt injector block also contains guides which commence in the primary channel and continue past the confluence into the unified channel and the primary channel enters the secondary channel between the guides.

2. A melt injector block which comprises:
   (a) one primary channel for a primary laminaflow stream of molten thermoplastic polymer,
   (b) one secondary channel for a primary laminaflow stream of molten thermoplastic polymer,
   (c) a unified channel for a composite stream, and
   (d) a confluence where the secondary channel enters the primary channel.
   characterised in that the melt injector block also includes a single pair of guides positioned partly in the primary channel and partly in the unified channel, the secondary channel entering the unified channel between the guides.

3. A melt injector block according to claim 2 in which the guides are parallel to one another and they are spaced apart by a distance equal to the width of the secondary channel at the confluence.

4. A melt injector block which comprises:
   (a) one primary channel for a primary laminaflow stream of molten thermoplastic polymer,
   (b) two secondary channels for secondary laminaflow streams of molten thermoplastic polymer,
   (c) a unified channel for a composite stream, and
   (d) two confluences each confluence being where a secondary channel enters the primary channel,
   characterised in that the melt injector block also includes two pairs of guides, each pair being positioned partly in the primary channel and continuing past one of the confluences into the unified channel, each secondary channel entering the unified channel at a confluence situated between one pair of guides.

5. A melt injector block according to claim 4, in which all four guides are parallel to one another and each pair is spaced apart by a distance equal to the width of the secondary channel at the confluence between that pair of guides.

6. A method of making a laminate of thermoplastics materials comprising the steps of:
   (a) joining in a tube one primary laminaflow stream of molten thermoplastic resin and at least one secondary lamina-flow stream of molten thermoplastic resin to obtain a composite lamina-flow stream of molten thermoplastic resin which has a sharply defined principle juncture or sharply defined principle junctures between the components of the composite stream;
   (b) passing said composite stream into the manifold of a sheeting extrusion die, the principle juncture plane being parallel to the principle direction of flow of the resin as it passes from the manifold and takes on the shape of sheeting;
   (c) extruding the composite stream under conditions of lamina-flow whereby a laminate is produced having the edges thereof consisting of thermoplastic resin from the primary extruder;
   (d) subjecting the laminate to sideways draw in a stenter; and
   (e) cutting off the edges of said laminate as edge trim, said edge trim consisting at least substantially of thermoplastic resin from the primary extruder; characterised in that at the or each confluence where the or each secondary stream joins the primary stream the or each secondary stream is confined between guides and flows in contact with the primary stream until the velocities match whereby the width of the secondary stream is determined by the distance between the guides.

7. A method according to claim 6, wherein the primary stream is homopolymer polyethylene terephthalate and the secondary stream is a copolyester of ethylene glycol with 95 to 70 mole % of terephthalic acid and 5 to 30 mole % of isophthalic acid.

* * * * *